(12) United States Patent
Wang

(10) Patent No.: US 12,556,129 B1
(45) Date of Patent: Feb. 17, 2026

(54) ELECTRIC LIFTING PHOTOVOLTAIC PANEL POWER GENERATION DEVICE

(71) Applicant: Ning Wang, Weihai (CN)

(72) Inventor: Ning Wang, Weihai (CN)

( * ) Notice: Subject to any disclaimer, the term of this patent is extended or adjusted under 35 U.S.C. 154(b) by 0 days.

(21) Appl. No.: 19/297,092

(22) Filed: Aug. 12, 2025

(51) Int. Cl.
*H02S 20/30* (2014.01)
*H02S 30/10* (2014.01)

(52) U.S. Cl.
CPC .............. *H02S 20/30* (2014.12); *H02S 30/10* (2014.12)

(58) Field of Classification Search
CPC .......... H02S 20/00; H02S 20/30; H02S 30/10; H02S 10/40
See application file for complete search history.

(56) References Cited

U.S. PATENT DOCUMENTS

| | | | |
|---|---|---|---|
| 2009/0165841 A1* | 7/2009 | Gunn, Jr. ................ | H02S 20/00 136/245 |
| 2011/0023864 A1* | 2/2011 | Andretich .............. | H02S 10/40 126/714 |
| 2021/0044251 A1* | 2/2021 | Searcy .................... | H02S 20/32 |

FOREIGN PATENT DOCUMENTS

SK     500012012 U1  *  5/2012

OTHER PUBLICATIONS

Machine translation of SK-500012012-U1, Lukac Vladimir. (Year: 2012).*

* cited by examiner

*Primary Examiner* — Mayla Gonzalez Ramos
(74) *Attorney, Agent, or Firm* — JEEN IP LAW, LLC

(57) ABSTRACT

An electric lifting photovoltaic panel power generation device is provided. The device includes a support frame component, a lifting component, and a photovoltaic panel fixing component. The lifting component and the photovoltaic panel fixing component are both provided on the support frame component. The photovoltaic panel fixing component can be lifted and lowered from 0° to 60° by the lifting component with the support frame component as a reference point. The lifting component is provided on a U-shaped piece, and the lifting component is connected to a receiver. The photovoltaic panel fixing component includes a bottom fixing L-shaped plate, a L-shaped plate, a U-shaped groove plate and other components. The fixation and lifting of the photovoltaic panel are achieved through cooperation of each component. The device has remote control electric lifting function, which can be controlled in single or multiple groups.

9 Claims, 7 Drawing Sheets

ELECTRIC LIFTING PHOTOVOLTAIC PANEL POWER GENERATION DEVICE

TECHNICAL FIELD

The present disclosure relates to the field of lifting photovoltaic panels technologies, and in particular, to an electric lifting photovoltaic panel power generation device.

BACKGROUND

At present, there are many limitations in the practical application of photovoltaic panel power generation devices on the market. For example, most devices do not have convenient electric lifting functions, rendering it difficult to flexibly adjust the angle and height of photovoltaic panels when facing different lighting conditions or special scenarios, resulting in suboptimal power generation efficiency. Moreover, some existing lifting systems have relatively simple control methods and can only perform simple single group operations, which cannot achieve multi group collaborative control. In scenarios where large-scale deployment of photovoltaic panels is required, the operational efficiency is low.

At the same time, the safety protection performance of existing devices also needs to be improved. Some devices lack effective anti-collision functions, which can easily cause device damage or even safety accidents when encountering obstacles during the lifting process. In terms of wind resistance, many devices are difficult to cope with strong wind environments, especially when in an extended state. Insufficient stability in the face of crosswinds may cause damage to the device or affect normal power generation.

Besides that, there are shortcomings in the linkage control with other devices. For example, it is not possible to link with the ACC signal of the car, and when it needs to be used in the vehicle scene, the lifting and lowering of the photovoltaic panel cannot be automatically controlled according to the state of the car key, which greatly reduces the convenience of use. Moreover, most devices do not have the function of stopping at any angle, which makes it difficult to accurately control the position of the photovoltaic panel according to actual needs, resulting in significant deficiencies in flexibility in use.

SUMMARY

The purpose of the present disclosure is to provide an electric lifting photovoltaic panel power generation device, aimed at solving the problems existing in the background technology. To achieve the objectives, the technical solution adopted by the present disclosure is as follows.

An electric lifting photovoltaic panel power generation device, including a support frame component, a lifting component, and a photovoltaic panel fixing component; the lifting component and the photovoltaic panel fixing component are both provided on the support frame component, and the photovoltaic panel fixing component is lifted and lowered by the lifting component with the support frame component as a reference point.

In some embodiments of the present disclosure, the support frame component includes a front bracket, a base, a rear bracket, sealing pieces, a fixing L-shaped plate, a U-shaped piece, a side frame, and a first auxiliary rod mounting piece; the front bracket is connected to the rear bracket through the base, the sealing pieces are provided on left and right sides of the front bracket and the rear bracket, the fixing L-shaped plate is provided on outer sides of the front bracket and the rear bracket; the U-shaped piece is provided on one side of the base close to the front bracket, the side frames are provided on left and right sides of the base, and an inner side of a tail of the side frame is provided with the first auxiliary rod mounting piece.

In some embodiments of the present disclosure, the lifting component is an electric cylinder, the electric cylinder is connected to a receiver, and the electric cylinder is provided on the U-shaped piece.

In some embodiments of the present disclosure, the photovoltaic panel fixing component includes a bottom fixing L-shaped plate, an L-shaped plate, a U-shaped groove plate, a head fixing plate, a second auxiliary rod mounting piece, and hinges; a front left side, a front middle side, and a front right side of the rear bracket are all provided with the hinges; the bottom fixing L-shaped plate is flexibly connected to the rear bracket through the hinges; a bottom middle of the bottom fixing L-shaped plate is provided with the U-shaped groove plate, left and right sides of the U-shaped groove plate are both provided with the L-shaped plate, the head fixing plate is provided on a head portion of the L-shaped plate; an outer side of the head portion of the L-shaped plate is provided with the second auxiliary rod mounting piece.

In some embodiments of the present disclosure, an auxiliary rod is provided between the first auxiliary rod mounting piece and the second auxiliary rod mounting piece.

In some embodiments of the present disclosure, a tail of the U-shaped groove plate is provided with a sliding hole, a telescopic rod of the electric cylinder is provided with a through shaft, the through shaft is provided inside the sliding hole, and a positioning ring is provided on the through shaft.

In some embodiments of the present disclosure, locking rods are further provided on left and right sides of the through shaft.

In some embodiments of the present disclosure, a top left side and a top right side of the front bracket are both provided with through seats, the through seats cooperate with the locking rods to lock the device.

In some embodiments of the present disclosure, the photovoltaic panel fixing component is lifted and lowered from 0° to 60° by the lifting component with the support frame component as a reference point.

In some embodiments of the present disclosure, the photovoltaic panel fixing component is further provided with a wind sensor.

The beneficial effects of the present disclosure are as follows.

Flexible and convenient lifting control: provided with a remote-controlled electric lifting system, it can achieve individual or multiple group controls to meet the needs of different scenarios. After electric retraction, it can automatically lock to prevent accidental pulling out, thereby improving the safety and stability of the device.

Reliable safety protection function: it has a controllable thrust anti-collision function. When the device encounters obstacles during the lifting process, it will automatically stop, thereby effectively avoiding device damage and ensuring the safe operation of the device.

Intelligent linkage control: through ACC linkage control, after connecting the ACC signal and opening a car key, a raised photovoltaic panel can be automatically retracted, achieving intelligent linkage with the car system and improving the convenience and intelligence level of use.

Strong wind resistance: it has a wind resistance of level 8 and can be provided with wind sensors, which can work stably in strong wind environments, reducing the impact of wind on the device and ensuring the continuity and stability of power generation.

Accurate angle control: with the function of stopping at any angle, the device can be stopped and continued at any angle during the process of rising or falling through the remote control, enabling the photovoltaic panel to be accurately positioned at the desired angle, thereby maximizing the utilization of light resources and improving power generation efficiency.

Numeral reference: 1—support frame component; 11—front bracket; 12—base; 13—rear bracket; 14—sealing piece; 15—fixing L-shaped plate; 16—U-shaped piece; 17—side frame; 18—first auxiliary rod mounting piece; 2—lifting component; 3—photovoltaic panel fixing component; 31—bottom fixing L-shaped plate; 32—L-shaped plate; 33—U-shaped groove plate; 331—sliding hole; 34—head fixing plate; 35—second auxiliary rod mounting rod; 36—hinge; 4—auxiliary rod; 5—through shaft; 6—positioning ring; 7—locking rod; 8—through seat.

DESCRIPTION OF EMBODIMENTS

In order to facilitate the understanding of the present disclosure, a more comprehensive description of the present disclosure will be provided below with reference to the relevant drawings. The preferred embodiment of the present disclosure is shown in the accompanying drawings. However, the present disclosure can be implemented in many different forms and is not limited to the embodiments described herein. On the contrary, the purpose of providing these embodiments is to provide a more thorough and comprehensive understanding of the present disclosure.

It should be noted that when a component is referred to as "fixed to" another component, it can be directly on the other component or there can also be a centered component. When a component is referred to be "connected" to another component, it can be directly connected to another component or there may be a central component present at the same time. On the contrary, when a component is referred to as "directly on" another component, there is no intermediate component. Terms "vertical", "horizontal", "left", "right" and similar expressions used in this specification are for illustrative purposes only and do not represent the only implementation mode. Terms "upper end", "lower end", "left side", "right side", "front end", "rear end" and similar expressions used in this specification are based on the positional relationship of the reference figures.

Unless otherwise defined, all technical and scientific terms used in this specification have the same meanings as those commonly understood by those skilled in the art belonging to the present disclosure. Terms used in this specification of the present disclosure are only for the purpose of describing specific embodiments and are not intended to limit the present disclosure. Terms "and/or" used in this specification include any and all combinations of one or more related listed items.

Below, a further detailed explanation of the technical solution of the present disclosure will be provided in combination with specific implementation modes.

Figure 1:
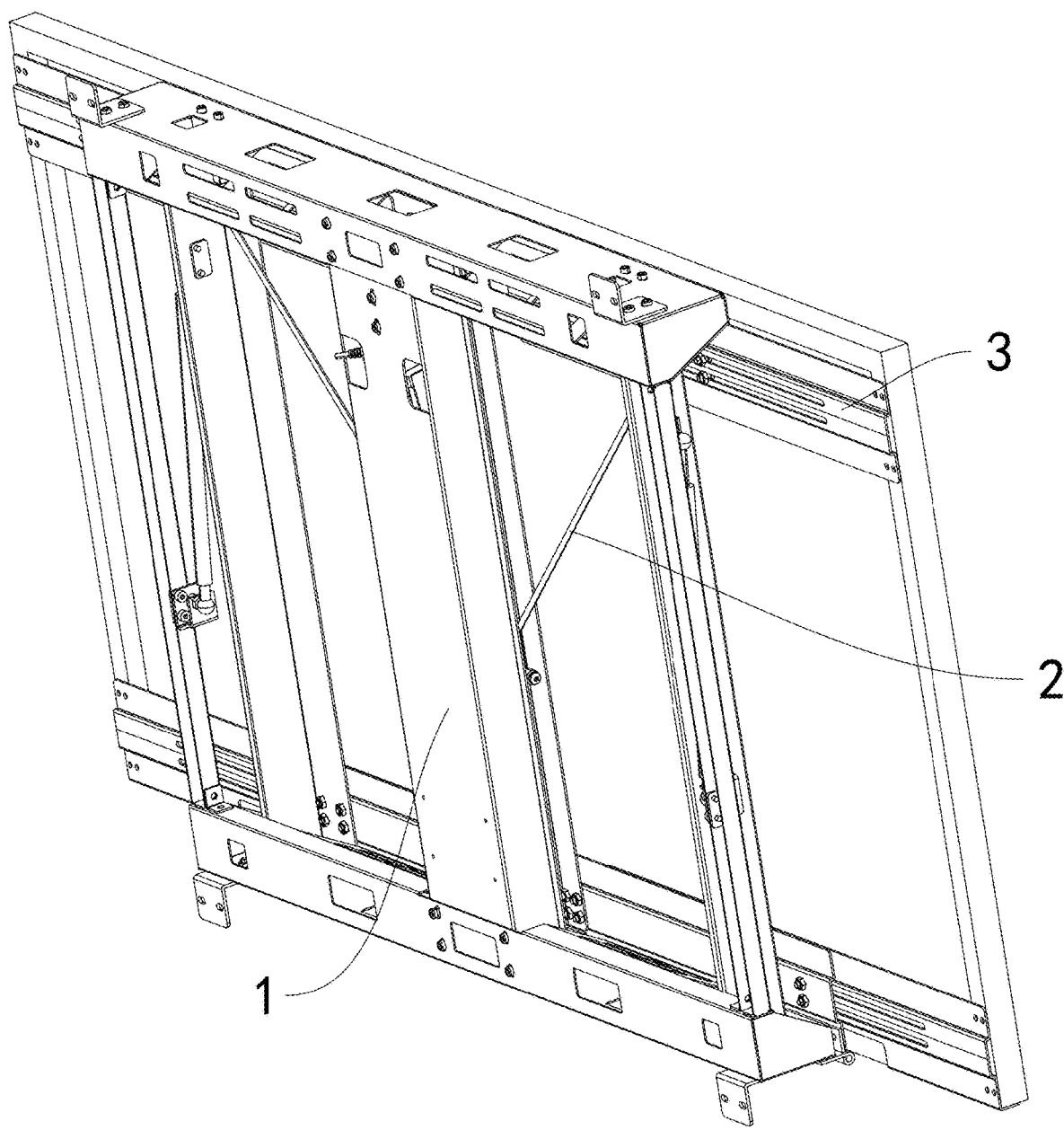
FIG. 1 is an overall schematic diagram provided by an embodiment of the present disclosure.
Figure 2:
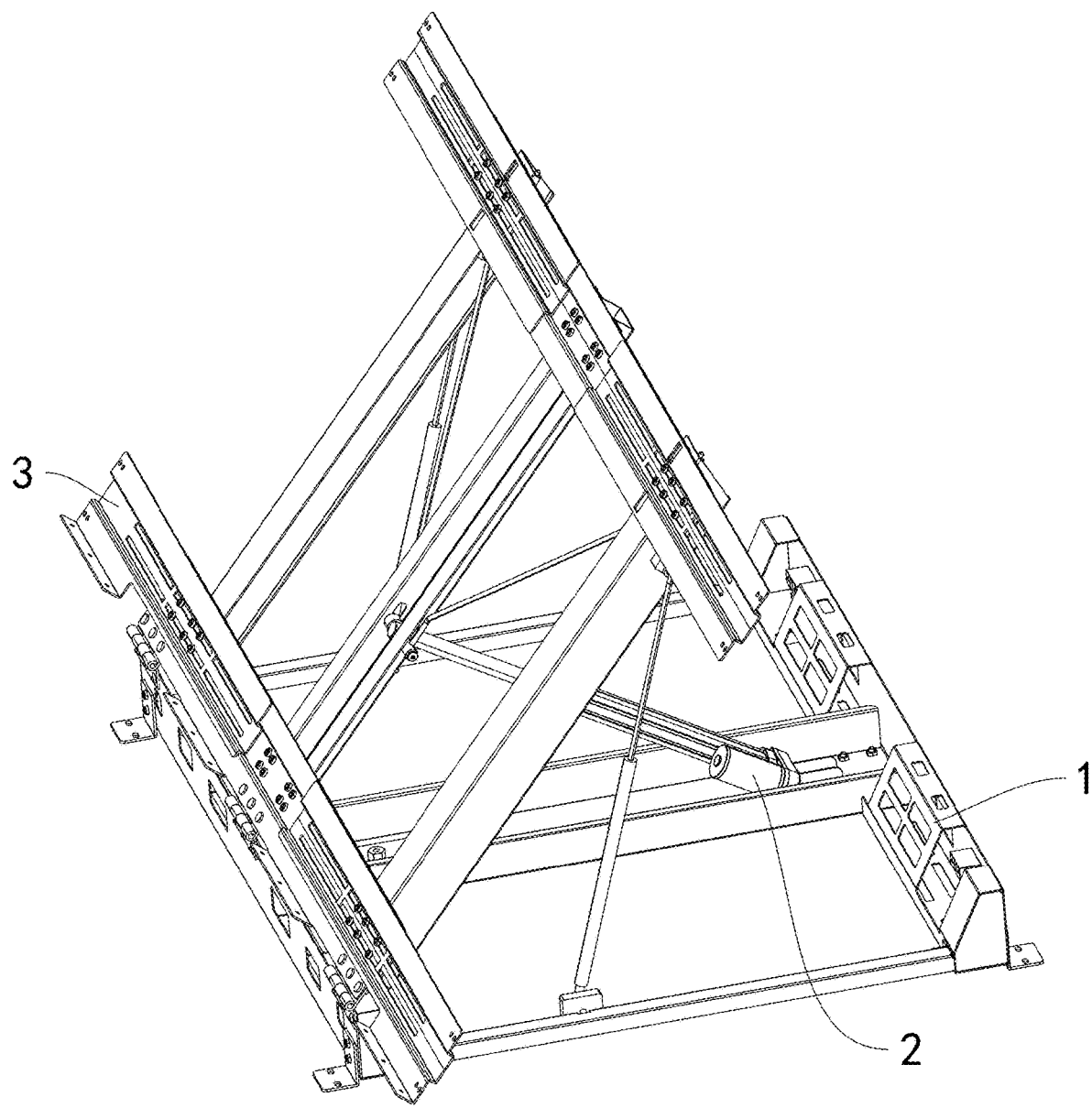
FIG. 2 is an overall deployment schematic diagram provided by an embodiment of the present disclosure.
Figure 3:
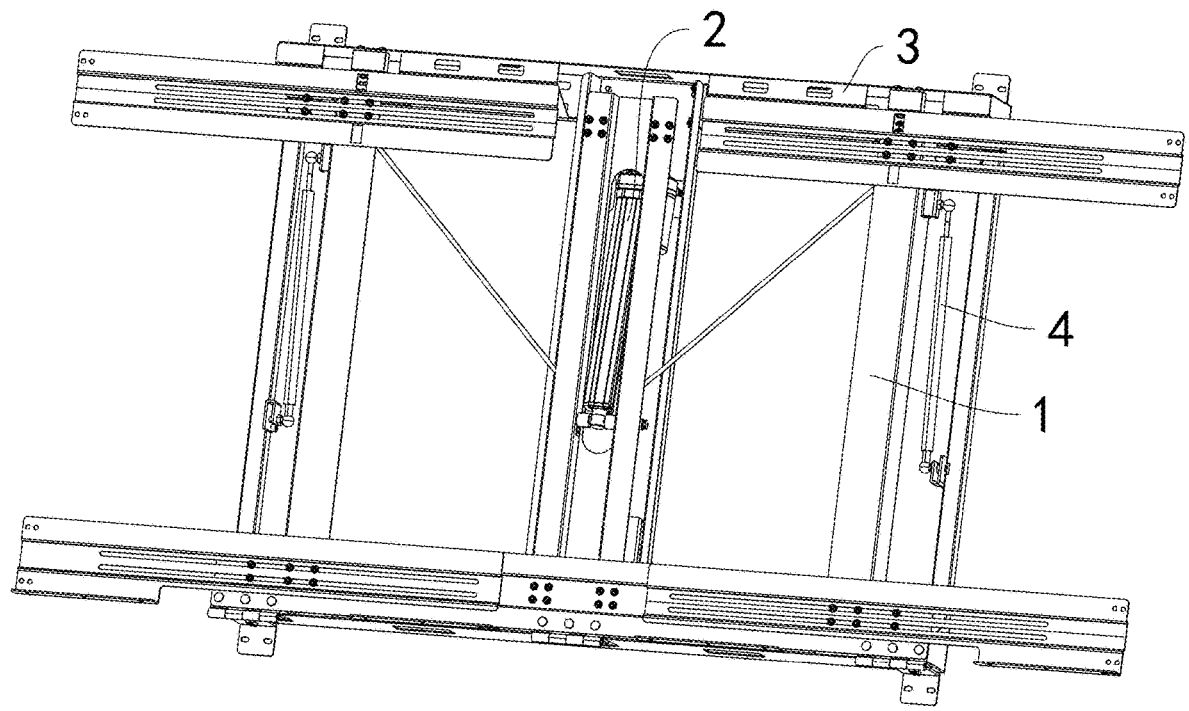
FIG. 3 is a schematic diagram of an overall structure provided by an embodiment of the present disclosure.
Figure 4:
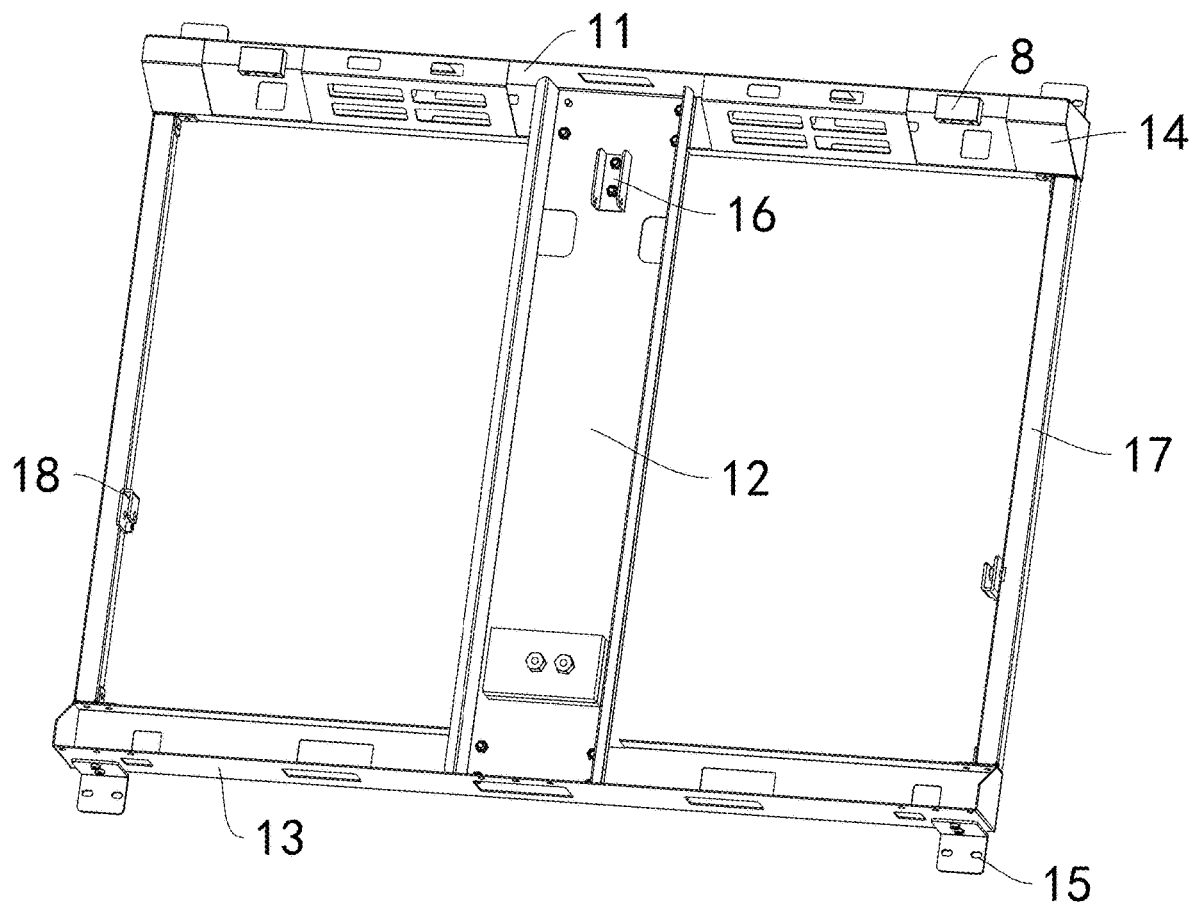
FIG. 4 is a schematic structural diagram of a support frame component provided in an embodiment of the present disclosure.
Figure 5:
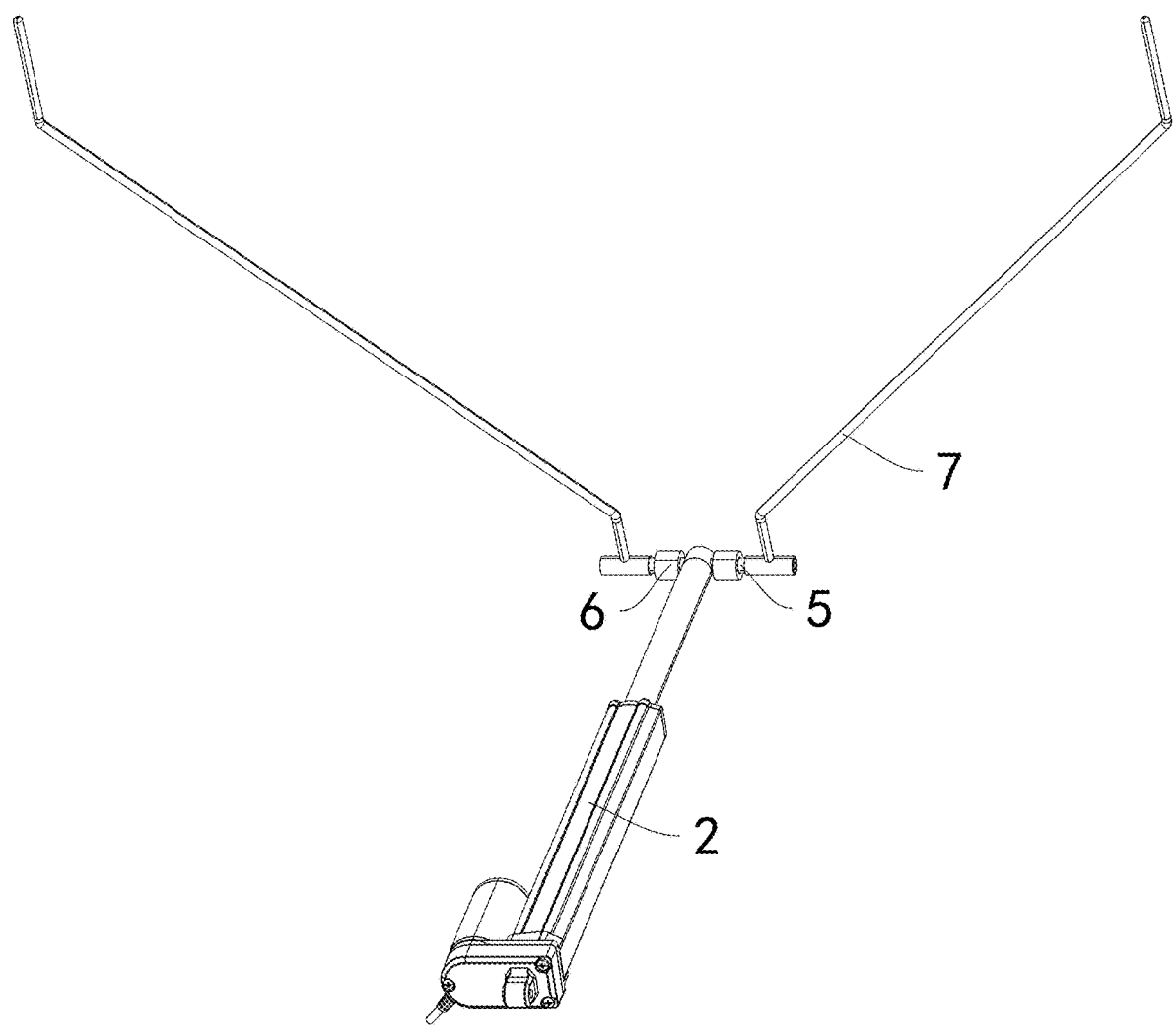
FIG. 5 is a schematic structural diagram of a partial component of an embodiment of the present disclosure.
Figure 6:
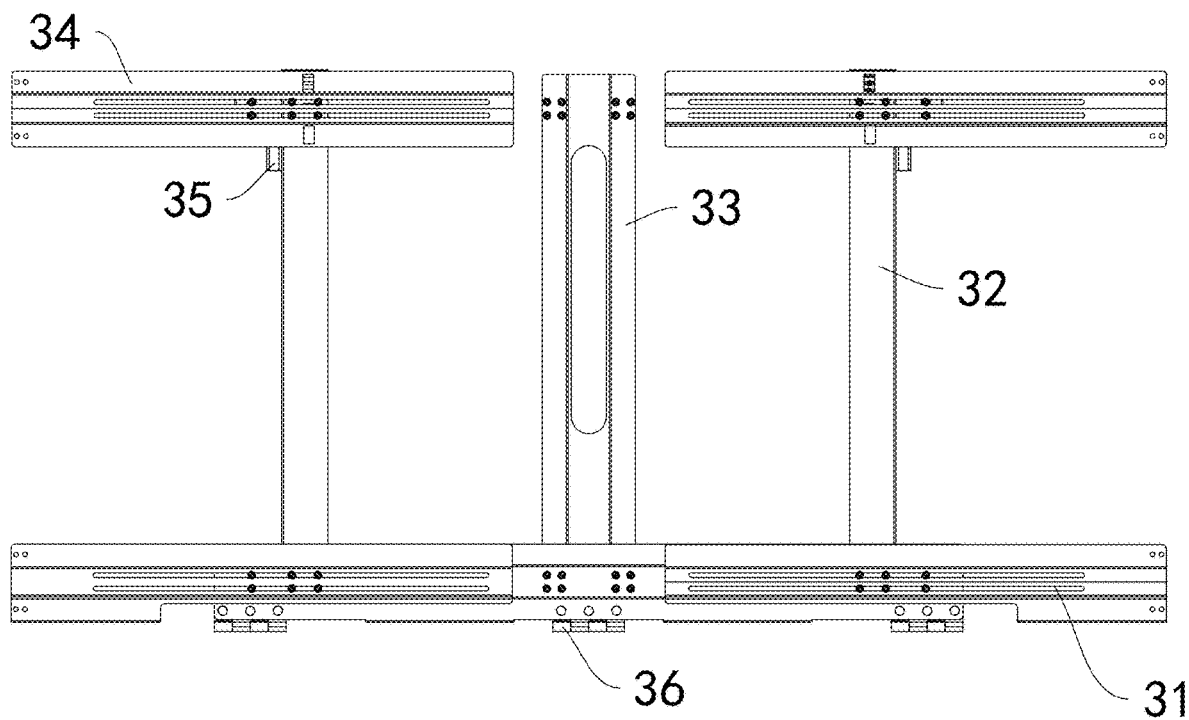
FIG. 6 is a schematic structural diagram of a photovoltaic panel fixing component according to an embodiment of the present disclosure.
Figure 7:
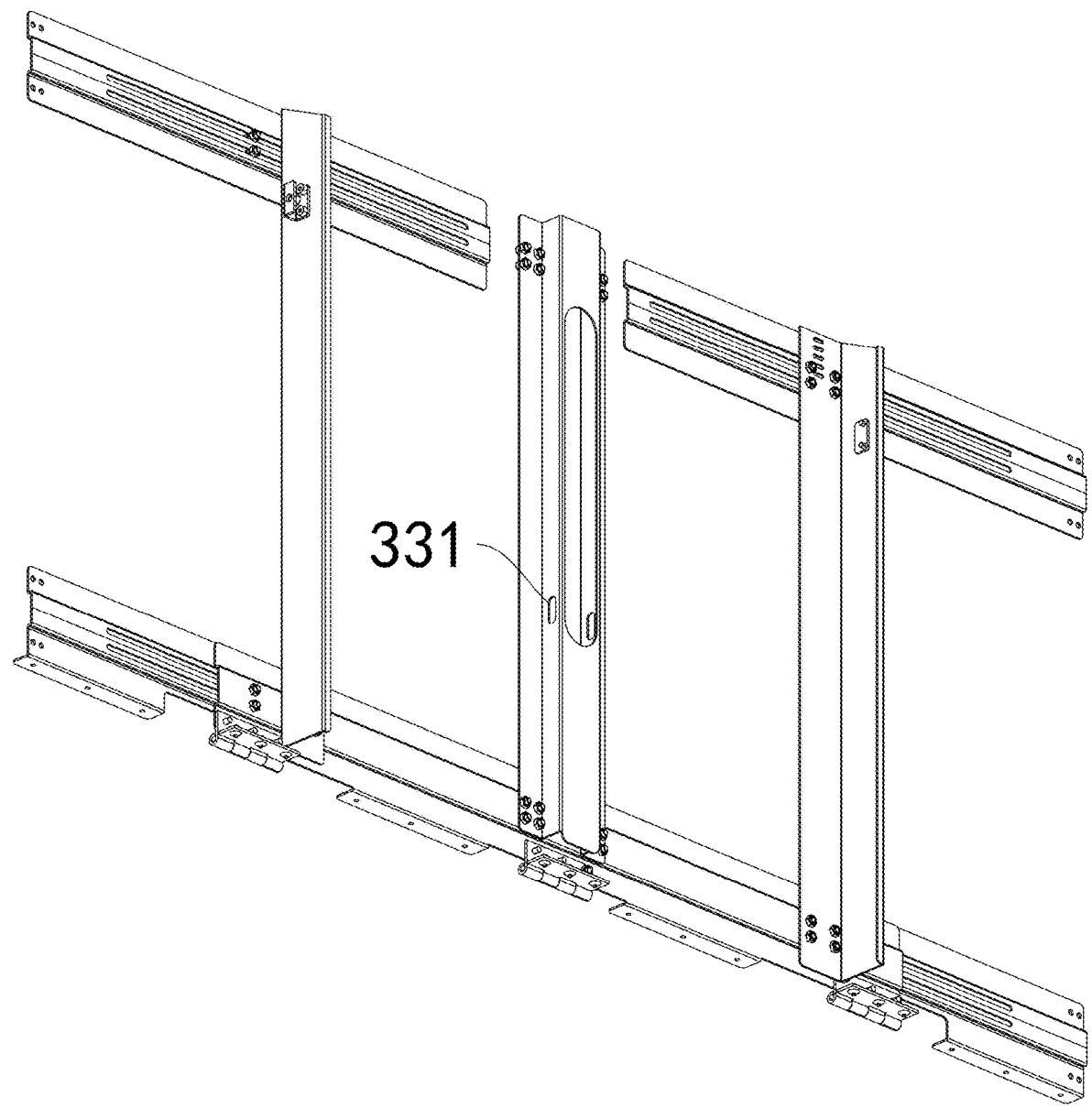
FIG. 7 is a schematic structural diagram of a sliding hole of an embodiment of the present disclosure.

As shown in FIGS. 1-7, an embodiment of the present disclosure provides an electric lifting photovoltaic panel power generation device, including a support frame component 1, a lifting component 2, and a photovoltaic panel fixing component 3. The lifting component 2 and the photovoltaic panel fixing component 3 are both provided on the support frame component 1, and the photovoltaic panel fixing component 3 is lifted and lowered by the lifting component 2 with the support frame component 1 as a reference point.

In this embodiment, the support frame component 1 includes a front bracket 11, a base 12, a rear bracket 13, sealing pieces 14, a fixing L-shaped plate 15, a U-shaped piece 16, a side frame 17, and a first auxiliary rod mounting piece 18. The front bracket 11 is connected to the rear bracket 13 through the base 12, and sealing pieces 14 are provided on left and right sides of the front bracket 11 and the rear bracket 13. The fixing L-shaped plate 15 is provided on outer sides of the front bracket 11 and the rear bracket 13, and the U-shaped piece 16 is provided on an inner side of the base 12 close to the front bracket 11. Side frames 17 are provided on left and right sides of the base 12, and a first auxiliary rod mounting piece 18 is provided on an inner side of a tail of the side frame 17.

In this embodiment, the lifting component 2 is an electric cylinder, and the electric cylinder is connected to a receiver, and the electric cylinder is provided on the U-shaped piece 16.

In this embodiment, the photovoltaic panel fixing component 3 includes a bottom fixing L-shaped plate 31, a L-shaped plate 32, a U-shaped groove plate 33, a head fixing plate 34, a second auxiliary rod mounting rod 35, and a hinge 36. A front left side, a front middle side, and a front right side of the rear bracket 13 are all provided with hinges 36, and the bottom fixing L-shaped plate 31 is connected to the rear bracket 13 through hinges 36. A bottom middle of the bottom fixing L-shaped plate 31 is provided with a U-shaped groove plate 33, and left and right sides of the U-shaped groove plate are both provided with the L-shaped plate 32. The head fixing plate 34 is provided on a head portion of the L-shaped plate 32, and the second auxiliary rod mounting rod 35 is provided on an outer side of the head portion of the L-shaped plate 32.

In this embodiment, an auxiliary rod 4 is provided between the first auxiliary rod mounting piece 18 and the second auxiliary rod mounting rod 35.

In this embodiment, a tail of the U-shaped groove plate 33 is provided with a sliding hole 331, and a through shaft 5 is provided on a telescopic rod of the electric cylinder. The through shaft 5 is provided inside the sliding hole 331, and a positioning ring 6 is provided on the through shaft 5.

In this embodiment, locking rods 7 are further provided on left and right sides of the through shaft 5.

In this embodiment, a top left side and a top right side of the front bracket 11 are both provided with through seats 8, and the through seats 8 cooperate with the locking rod 7 to lock the device.

In this embodiment, the photovoltaic panel fixing component 3 is lifted and lowered from 0° to 60° by the lifting component 2 with the support frame component 1 as a reference point.

In this embodiment, the photovoltaic panel fixing component 3 is further provided with a wind sensor.

Workflow

1. Remote Control Process

Single Control Operation

Preparation work: checking if all components of the device are securely provided, ensuring that the power connection is normal, the voltage is within a range of DC11-15V, and the current is greater than 5A.

Opening device: pressing the corresponding button (1-6) on a remote control to start a corresponding electric lifting photovoltaic panel power generation system, and the device is starting to rise.

Angle adjustment: during a rising process of the device, if it is needed to stop at a certain angle, the number button is pressed again to stop the device; to continue rising, the button is pressed again, and the device will continue to run. This operation can be performed at any time before the device reaches its maximum angle (60°).

Retraction operation: when it is necessary to retract the photovoltaic panel, the corresponding number button is pressed, and the device will start to descend until it is fully retracted and automatically locked. At this time, it cannot be pulled out.

Group Control Operation

Preparation Work is the Same as that of the Single Control Operation

General opening operation: pressing a general opening button on a remote control, and all connected systems will respond to an extension action simultaneously, and the photovoltaic panel will start to rise.

Stop operation: during the rising or falling process, the general button is pressed to stop the current operation of all systems.

General closing retraction operation: pressing and holding the general closing button, and all systems will perform retraction actions until they are fully retracted and automatically locked.

2. ACC Linkage Control Process

Connecting the ACC signal: connecting an ACC linkage control module of the device correctly to the ACC signal source of the car.

State detection: when the motion mechanism (photoelectric panel) is not in a retracted state, the ACC signal is triggered when a car key is turned on.

Automatic retraction: after receiving the ACC signal, the device automatically executes the retraction action, lowering and locking the photovoltaic panel.

Operation restriction: when ACC being turned on, all remote-control operations are invalid. ACC signal priority being higher than that of the remote control, ensuring that the device is in a safe state when the car is started.

3. Anti-Collision Function Workflow

Normal operation: during the lifting process of the device, the electric cylinder operates at a set thrust (>20 KG) to push the photovoltaic panel fixing component 3 up and down.

Obstacle detection: when the photovoltaic panel encounters obstacles during the lifting process, the thrust of the electric cylinder will instantly increase. When the thrust exceeds a resistance thrust (>25 KG), the sensors inside the device detect the change in resistance.

Stop when encountering obstacles: the sensor transmits a signal to the control system, which issues an instruction. The electric cylinder immediately stops running, and the photovoltaic panel fixing component 3 automatically stops to avoid hard collisions between the device and obstacles, thereby ensuring the safety of the protective device.

4. Wind Resistant Workflow

Wind monitoring: the device is provided with a wind sensor to monitor the real-time wind speed in the environment.

Wind force judgment: when the wind sensor detects a crosswind speed less than 17 m/s (wind resistance in extended state), the device works normally, and the photovoltaic panel remains in its current state.

Emergency response: if the wind speed exceeds level 8 or the crosswind speed is greater than 17 m/s, the wind sensor will transmit a signal to the control system. According to a preset program, the control system may issue the instruction to automatically retract the photovoltaic panel to a certain angle or fully retract it, in order to enhance the stability of the device, reduce the impact of wind on the device, and ensure the safe operation of the device in strong wind environments.

The above embodiments are only used to illustrate the present disclosure and not to limit the present disclosure. Those skilled in the art can make various changes and modifications without departing from scope of the present disclosure. Therefore, all equivalent technical solutions also belong to the scope of the present disclosure, and the protection scope of the present disclosure should be limited by the claims.

What is claimed is:

1. An electric lifting photovoltaic panel power generation device, comprising: a support frame component, a lifting component, and a photovoltaic panel fixing component;

the lifting component and the photovoltaic panel fixing component are both provided on the support frame component, and the photovoltaic panel fixing component is lifted and lowered by the lifting component with the support frame component as a reference point;

wherein the support frame component comprises a front bracket, a base, a rear bracket, sealing pieces, a first L-shaped plate, a U-shaped piece, side frames, and a first auxiliary rod mounting piece;

wherein the photovoltaic panel fixing component comprises a second L-shaped plate, a third L-shaped plate, a U-shaped groove plate, a head fixing plate, a second auxiliary rod mounting piece, and hinges, a front left side, a front middle side, and a front right side of the rear bracket are all provided with the hinges, the second L-shaped plate is flexibly connected to the rear bracket through the hinges, a bottom middle of the second L-shaped plate is provided with the U-shaped groove plate, left and right sides of the U-shaped groove plate are both provided with the third L-shaped plate, the head fixing plate is provided on a head portion of the third L-shaped plate, an outer side of the head portion of the third L-shaped plate is provided with the second auxiliary rod mounting piece.

2. The electric lifting photovoltaic panel power generation device according to claim 1, wherein the front bracket is connected to the rear bracket through the base, the sealing pieces are provided on left and right sides of the front bracket and the rear bracket, the first L-shaped plate is provided on outer sides of the front bracket and the rear bracket, the U-shaped piece is provided on one side of the base close to the front bracket, the side frames are provided on left and right sides of the base, and an inner side of a tail of the side frames is provided with the first auxiliary rod mounting piece.

3. The electric lifting photovoltaic panel power generation device according to claim 2, wherein the lifting component is an electric cylinder, the electric cylinder is connected to a receiver, and the electric cylinder is provided on the U-shaped piece.

4. The electric lifting photovoltaic panel power generation device according to claim 1, wherein an auxiliary rod is provided between the first auxiliary rod mounting piece and the second auxiliary rod mounting piece.

5. The electric lifting photovoltaic panel power generation device according to claim 4, wherein a tail of the U-shaped groove plate is provided with a sliding hole, a telescopic rod of the electric cylinder is provided with a through shaft, the through shaft is provided inside the sliding hole, and a positioning ring is provided on the through shaft.

6. The electric lifting photovoltaic panel power generation device according to claim 5, wherein locking rods are further provided on left and right sides of the through shaft.

7. The electric lifting photovoltaic panel power generation device according to claim 6, wherein a top left side and a top right side of the front bracket are both provided with through seats, the through seats cooperate with the locking rods to lock the device.

8. The electric lifting photovoltaic panel power generation device according to claim 7, wherein the photovoltaic panel fixing component is lifted and lowered from 0° to 60° by the lifting component with the support frame component as a reference point.

9. The electric lifting photovoltaic panel power generation device according to claim 8, wherein the photovoltaic panel fixing component is further provided with a wind sensor.

* * * * *